(No Model.)
T. McHUGH.
PLUMBER'S TRAP.
No. 425,339. Patented Apr. 8, 1890.
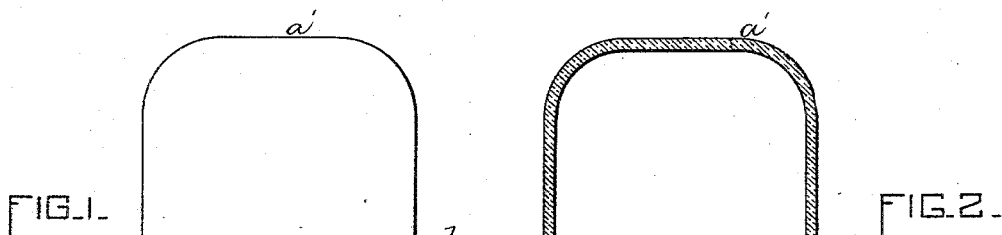
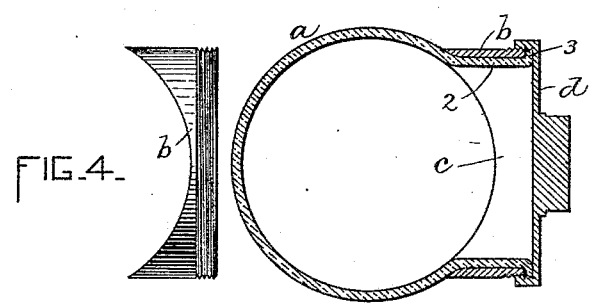
WITNESSES.
A. D. Harrison.
W. C. Ramsay.
INVENTOR
T. McHugh
by Wright Brown Emsley
Attys

UNITED STATES PATENT OFFICE.

TIMOTHY McHUGH, OF WAKEFIELD, ASSIGNOR OF ONE-HALF TO THE SMITH & ANTHONY STOVE COMPANY, OF BOSTON, MASSACHUSETTS.

PLUMBER'S TRAP.

SPECIFICATION forming part of Letters Patent No. 425,339, dated April 8, 1890.

Application filed October 17, 1889. Serial No. 327,353. (No model.)

*To all whom it may concern:*

Be it known that I, TIMOTHY McHUGH, of Wakefield, in the county of Middlesex and State of Massachusetts, have invented certain new and useful Improvements in Plumbers' Traps, of which the following is a specification.

This invention relates to a plumber's trap composed of a lead body having its mouth or other orifice surrounded by a hard-metal ring, externally screw-threaded for engagement with an internally-threaded cap.

The object of the invention is to provide a trap of this class in which the inner surface of the lead body shall be smooth and seamless throughout and devoid of solder joints or protuberances, and in which the screw-threads of the cap-engaging ring shall be so protected by the lead body of the trap as to be inaccessible to the liquid contents of the trap when the cap is in place, so that there will be no liability of corrosion or sticking together of the screw-threads of the ring and cover by the formation of verdigris or other matter thereon.

The invention consists in a trap composed of a lead body, which is a section of lead pipe of suitable diameter formed or drawn after the usual method of making lead pipe, an externally-screw-threaded ring of hard metal placed upon the exterior of said body, secured thereto by an extension of the lead body passing through the ring and having an outwardly-projecting flange bearing on the outer edge of the ring, said extension being formed by spinning the portion of the lead body composing it against the inner surface and outer end of the ring. The extension is therefore integral with the body of the trap and constitutes a lining and an end washer or packing-seat for the external ring, so that when the hard-metal cap or cover is screwed to place it will bear on the flange or seat portion of said extension and form a liquid-tight joint between the interior of the trap and the screw-threaded surface of the external ring, thus preventing the access of the contents of the trap to the screw-threads and the sticking of the cap to the ring, which would result if the acids, alkalies, &c., in the trap were allowed to reach the said screw-threads.

Of the accompanying drawings, forming a part of this specification, Figure 1 represents a side elevation of a trap embodying my invention. Fig. 2 represents a longitudinal section of the same. Fig. 3 represents a section on line 3 3, Fig. 1. Fig. 4 represents a top view of the external ring which surrounds the lateral opening in the trap.

The same letters of reference indicate the same parts in all of the figures.

In carrying out my invention I take for the body $a$ of the trap a section of lead pipe, which has been formed by the usual drawing process. Said section may be closed at one or both ends by spinning operation, whereby the said ends are turned inwardly until they form nearly complete heads $a'$, which may be completed by the use of solder.

$b$ represents the hard-metal ring which surrounds the orifice or mouth $c$ of the trap, said ring being externally screw-threaded. In case said orifice is located in the side of the trap the ring $b$ is made concave at its inner edge, as shown in Fig. 4, to fit the convex periphery of the trap-body. Said ring is placed upon the periphery of the body, and the material of the body within the circumference of the ring is perforated and turned outwardly by a suitable metal spinning tool or tools, the trap being held by a suitable chuck and rotated about an axis or center of rotation, which is at the center of the ring $b$. The concave edge of the ring enables it to closely fit the periphery of the body, so that the inner surface of the ring extends to the surface of the body all around the ring, and forms a support for the neck 2, formed by turning outwardly a portion of the body $a$ against the inner surface of the ring, said neck being formed by pressing the material of the body within the ring closely against the inner surface of the ring by a suitable tool while the trap is being rotated, as above described. The outer end of the neck 2 is turned outwardly over the outer end of the ring $b$, and forms an outwardly-projecting flange or lip 3, which is integral with the neck 2 and constitutes a lead seat or packing, on which the inner surface of the cap or cover $d$ bears when the latter is screwed to place on the ring. Said seat, being of lead, yields sufficiently to the pressure of the cap against it to conform perfectly to the inner surface of the cap, and thus make a tight joint, preventing the access of any liquid or other matters in the trap to the screw-threaded surfaces of the ring and cap. There is, therefore, no liability of the corrosion of said screw-threaded surfaces or the formation of verdigris thereon, the screw-threads being kept clear and bright, so that the cap can be readily unscrewed without the employment of force sufficient to twist or distort and injure the lead body of the trap.

It will be seen that by the employment of the ring $b$, made concave at its inner end and thereby closely fitted to the periphery of the trap, I am enabled to form the lateral opening in the trap entirely by spinning or turning outwardly the material of the trap within the ring, and at the same time to secure the ring to the trap-body and form a permanent seat or packing for the cap or part that is detachably secured to said ring. A lateral opening surrounded by a hard-metal screw-threaded ring is thus provided wholly without the use of solder, so that the inner surfaces of the trap and neck are devoid of protuberances, such as would be formed if solder were employed to secure the hard-metal ring to the trap-body.

By forming the neck 2 and flange or seat 3 by the spinning process, the material of said neck and flange is compacted and condensed, so that there is no liability of flaws or fissures therein, as there would be if the neck and flange were formed by casting.

By the employment of lead pipe, as described, I obtain a body the walls of which are condensed and compacted by the usual lead-pipe-forming operation.

I claim—

1. A plumber's trap composed of a lead pipe body having an orifice, an externally-screw-threaded hard-metal ring surrounding said orifice, a spun lead lining or neck closely fitting the inner surface of said ring, and a spun lead flange or seat bearing on the outer end of said ring, the said neck and flange being integral with each other and with the body, and serving both to protect the inner surface and outer end of the ring and to secure said ring to the body of the trap, as set forth.

2. A plumber's trap composed of a lead-pipe body having an orifice, an externally-screw-threaded hard-metal ring having inner concaved edges fitting the trap, a spun lead lining or neck fitting the inner surface of said ring, and a spun lead flange or seat bearing on the outer edge of said ring, the said neck and flange being integral with the body, substantially as set forth.

In testimony whereof I have signed my name to this specification, in the presence of two subscribing witnesses, this 5th day of September, A. D. 1889.

TIMOTHY McHUGH.

Witnesses:
C. F. BROWN,
A. D. HARRISON.